(12) United States Patent
Yamamoto et al.

(10) Patent No.: US 11,808,575 B2
(45) Date of Patent: Nov. 7, 2023

(54) VEHICLE TRAVELING CONTROL METHOD AND VEHICLE CONTROL SYSTEM

(71) Applicant: AICHI STEEL CORPORATION, Tokai (JP)

(72) Inventors: Michiharu Yamamoto, Tokai (JP); Kota Aratani, Tokai (JP); Kazuo Urakawa, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 287 days.

(21) Appl. No.: 17/417,795

(22) PCT Filed: Dec. 27, 2019

(86) PCT No.: PCT/JP2019/051550
§ 371 (c)(1),
(2) Date: Jun. 24, 2021

(87) PCT Pub. No.: WO2020/138471
PCT Pub. Date: Jul. 2, 2020

(65) Prior Publication Data
US 2022/0075385 A1 Mar. 10, 2022

(30) Foreign Application Priority Data

Dec. 28, 2018 (JP) .................................. 2018-248445
Mar. 1, 2019 (JP) .................................. 2019-037864

(51) Int. Cl.
*G01C 19/5776* (2012.01)
*G01C 21/28* (2006.01)
(Continued)

(52) U.S. Cl.
CPC ....... *G01C 19/5776* (2013.01); *B62D 15/025* (2013.01); *G01C 21/28* (2013.01);
(Continued)

(58) Field of Classification Search
CPC .......... G05D 2201/0213; G05D 1/0259; E01F 11/00
(Continued)

(56) References Cited

U.S. PATENT DOCUMENTS 4,852,677 A * 8/1989 Okazaki ............... G05D 1/0272
180/169
4,866,617 A * 9/1989 Matsuda .............. G05D 1/0272
701/25

(Continued)

FOREIGN PATENT DOCUMENTS

EP 0788044 A1 8/1997
JP 10-160493 A 6/1998
(Continued)

OTHER PUBLICATIONS

International Search Report for corresponding Application No. PCT/JP2019/051550, dated Mar. 24, 2020.

*Primary Examiner* — Yazan A Soofi
(74) *Attorney, Agent, or Firm* — Renner, Otto, Boisselle & Sklar, LLP

(57) ABSTRACT

A vehicle traveling control method for causing a vehicle to travel along a traveling road where magnetic markers are arrayed is a control method including an azimuth measuring process of performing a process on angular velocity, which is an output of a gyro sensor, and measuring a measured azimuth indicating an orientation of the vehicle, a control process of controlling the vehicle so that the measured azimuth is matched with a target azimuth corresponding to a direction of the traveling road, and a correction process of correcting a degree of control by the control process, in order to bring a lateral shift amount of the vehicle with reference to each of the magnetic markers closer to zero, in accordance with the lateral shift amount.

20 Claims, 16 Drawing Sheets

(51) Int. Cl.
    *G08G 1/01* (2006.01)
    *G08G 1/09* (2006.01)
    *B62D 15/02* (2006.01)
    *G05D 1/02* (2020.01)
(52) U.S. Cl.
    CPC .......... *G05D 1/027* (2013.01); *G05D 1/0261* (2013.01); *G08G 1/0116* (2013.01); *G08G 1/094* (2013.01); *G05D 2201/0213* (2013.01)
(58) Field of Classification Search
    USPC .......................................................... 701/25
    See application file for complete search history.

(56) References Cited

U.S. PATENT DOCUMENTS

| | | | | |
|---|---|---|---|---|
| 5,764,014 A * | 6/1998 | Jakeway | ................. | G05D 1/027 318/587 |
| 6,268,825 B1 * | 7/2001 | Okada | ..................... | B60T 8/172 701/454 |
| 6,378,772 B1 * | 4/2002 | Yonemura | ........ | G08G 1/096758 235/449 |
| 7,756,615 B2 * | 7/2010 | Barfoot | ................ | G05D 1/0297 701/25 |
| 2002/0022926 A1 * | 2/2002 | Suzuki | ................. | G05D 1/0261 340/988 |
| 2010/0141483 A1 * | 6/2010 | Thacher | ................ | G01S 13/825 340/989 |
| 2011/0118967 A1 * | 5/2011 | Tsuda | .................... | B60W 30/16 701/117 |
| 2015/0247719 A1 * | 9/2015 | Huang | ................. | B62D 15/025 701/41 |
| 2019/0031076 A1 * | 1/2019 | Yamamoto | ................ | B60P 3/00 |
| 2019/0196496 A1 * | 6/2019 | Yamamoto | .......... | G05D 1/0261 |
| 2020/0012294 A1 * | 1/2020 | Yamamoto | .......... | G05D 1/0261 |
| 2020/0133299 A1 * | 4/2020 | Yamamoto | .......... | G01C 21/165 |
| 2020/0320870 A1 * | 10/2020 | Yamamoto | ............. | G01C 21/28 |
| 2020/0332483 A1 * | 10/2020 | Michiharu | ........... | E01C 23/163 |
| 2021/0150905 A1 * | 5/2021 | Yamamoto | .......... | B62D 15/025 |

FOREIGN PATENT DOCUMENTS

| | | |
|---|---|---|
| JP | 10-301625 A | 11/1998 |
| JP | 2002-023847 A | 1/2002 |
| JP | 2005-170608 A | 6/2005 |
| JP | 2005-202478 A | 7/2005 |
| JP | 2017-061281 A | 3/2017 |
| JP | 2018-036797 A | 3/2018 |
| WO | 2017/209112 A1 | 12/2017 |
| WO | 2018/181053 A1 | 10/2018 |
| WO | 2018/230423 A1 | 12/2018 |

* cited by examiner

[FIG. 1]
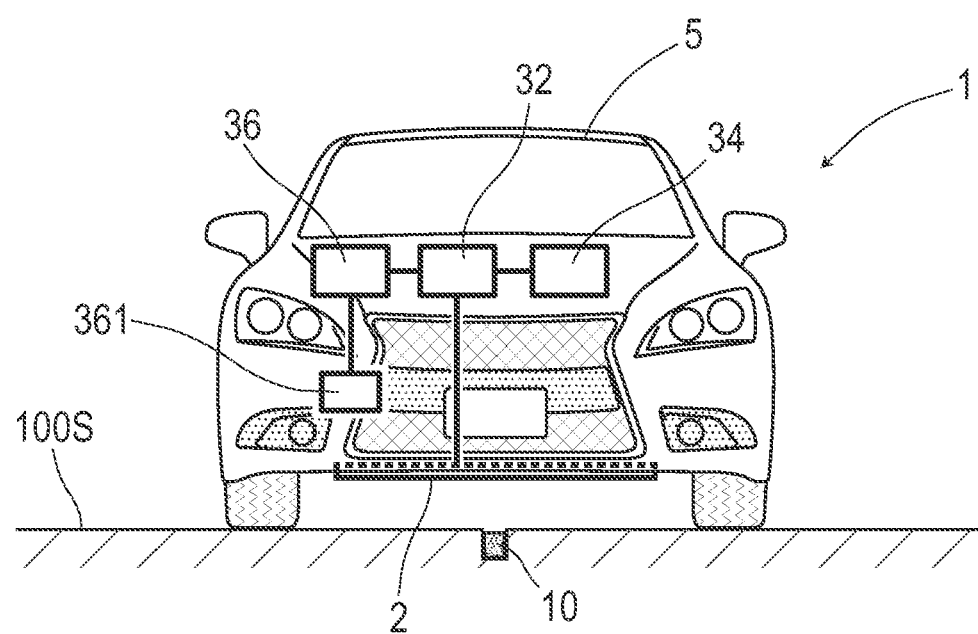

[FIG. 2]
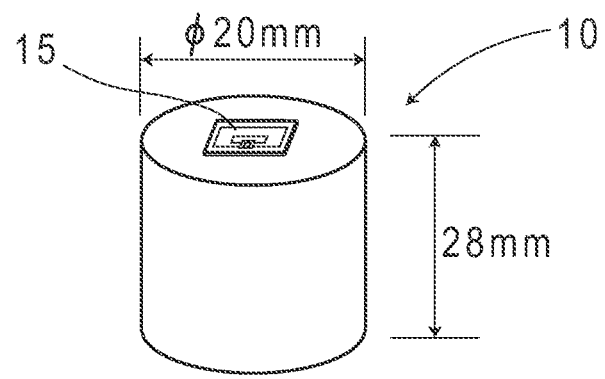

[FIG. 3]
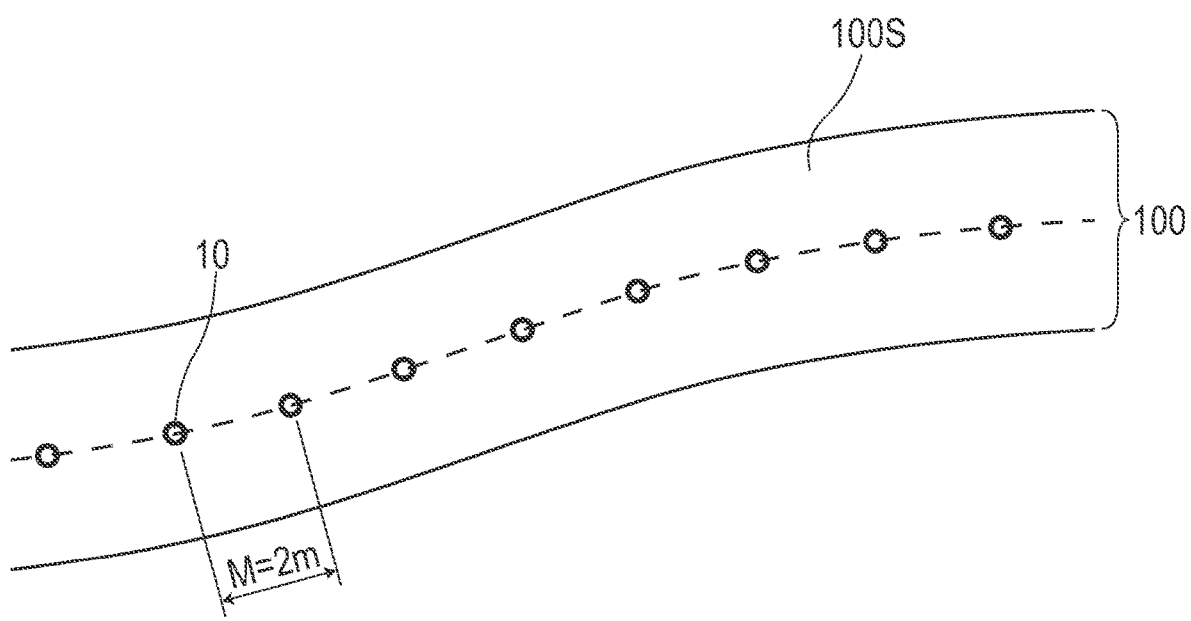

[FIG. 4]
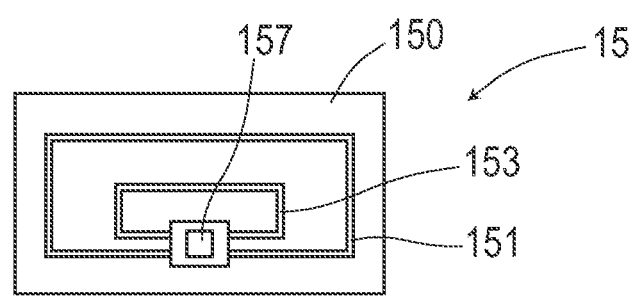

[FIG. 5]
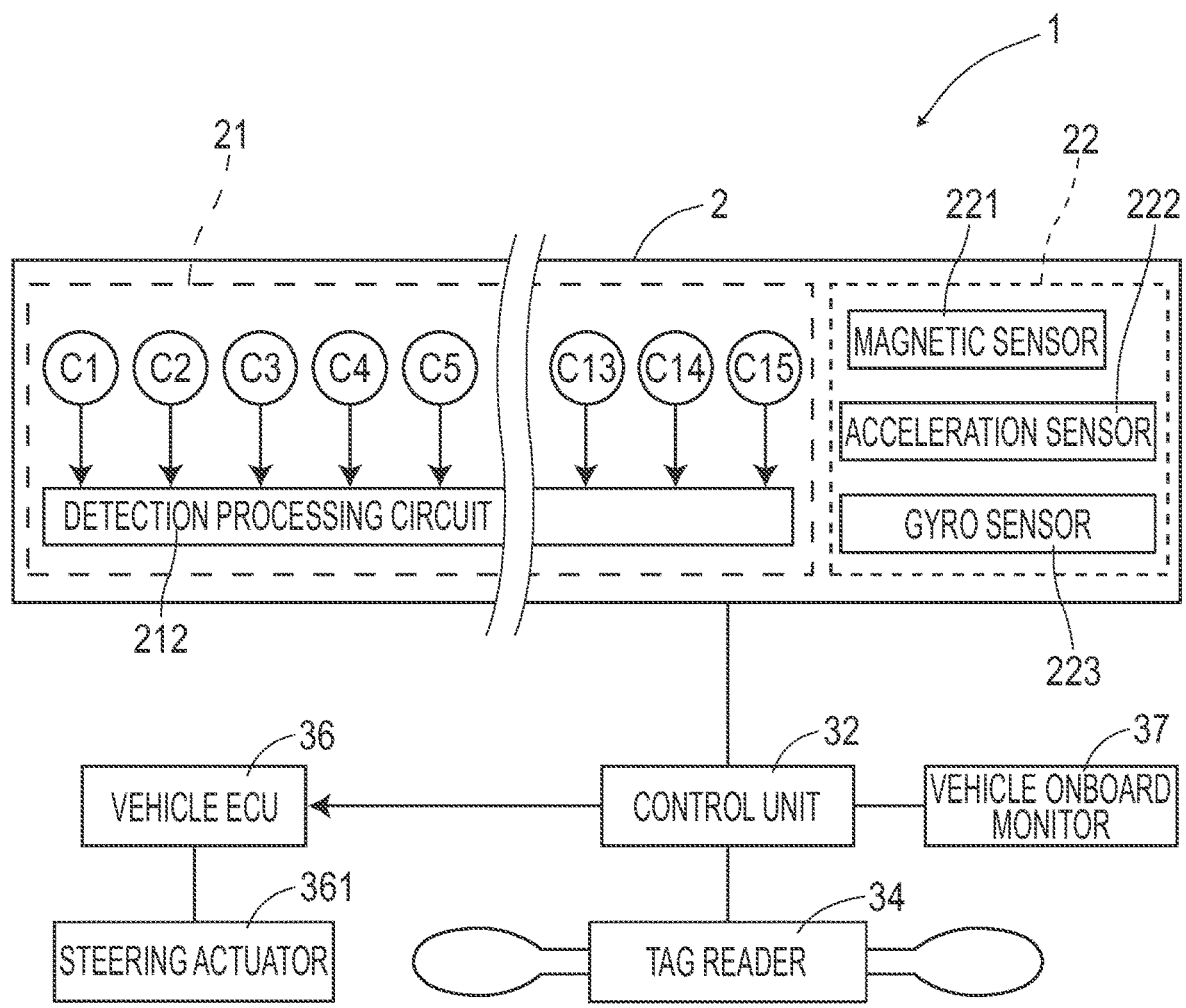

[FIG. 6]
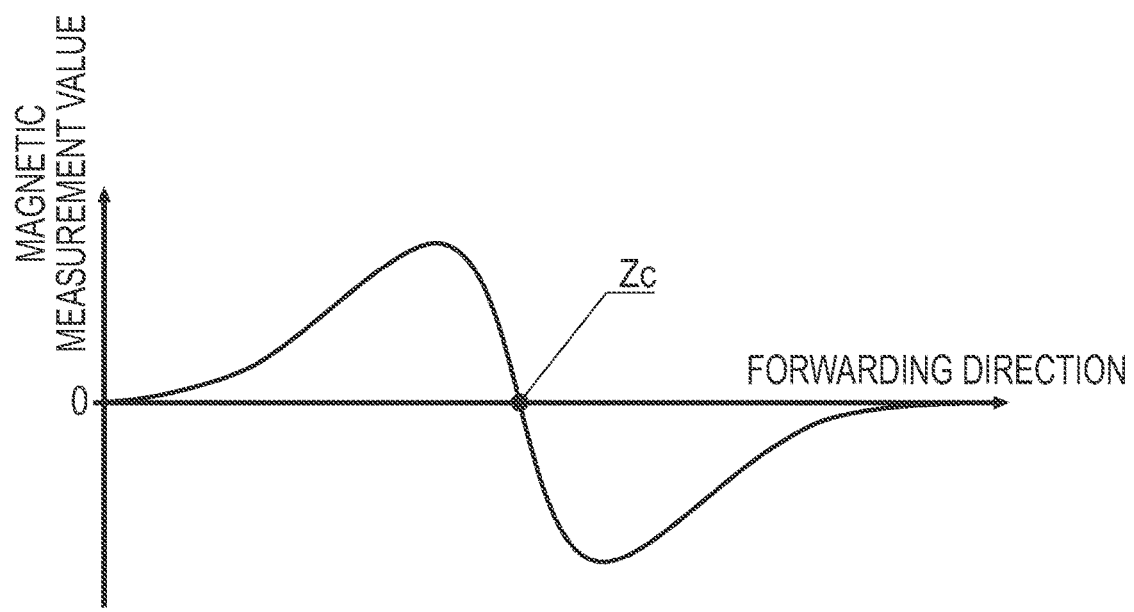

[FIG. 7]
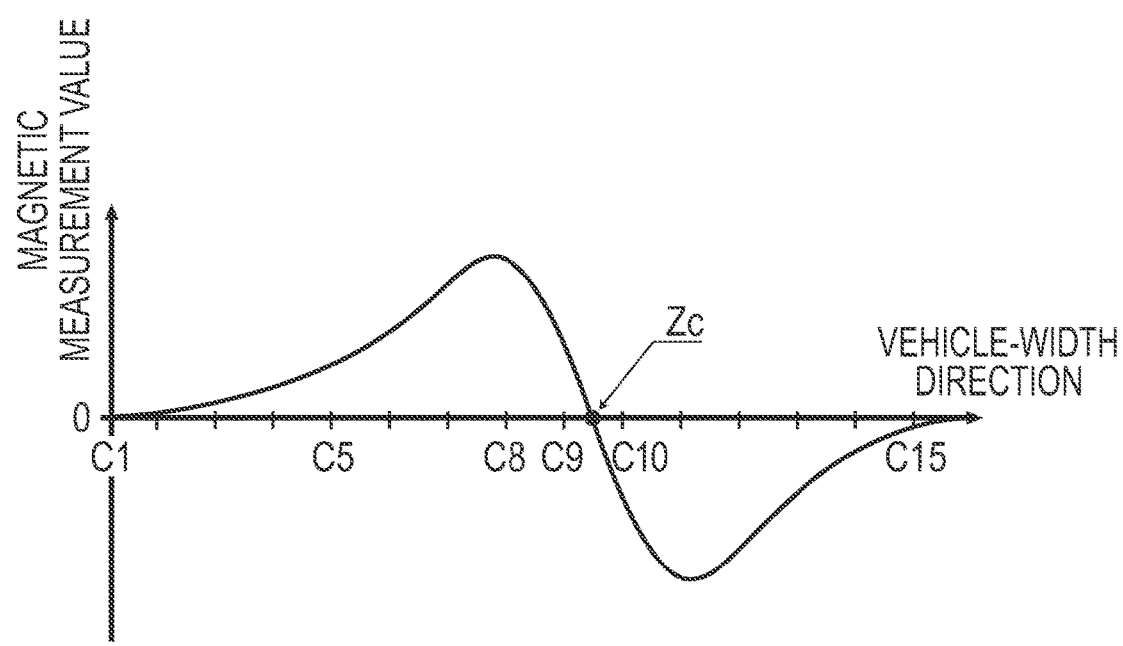

[FIG. 8]
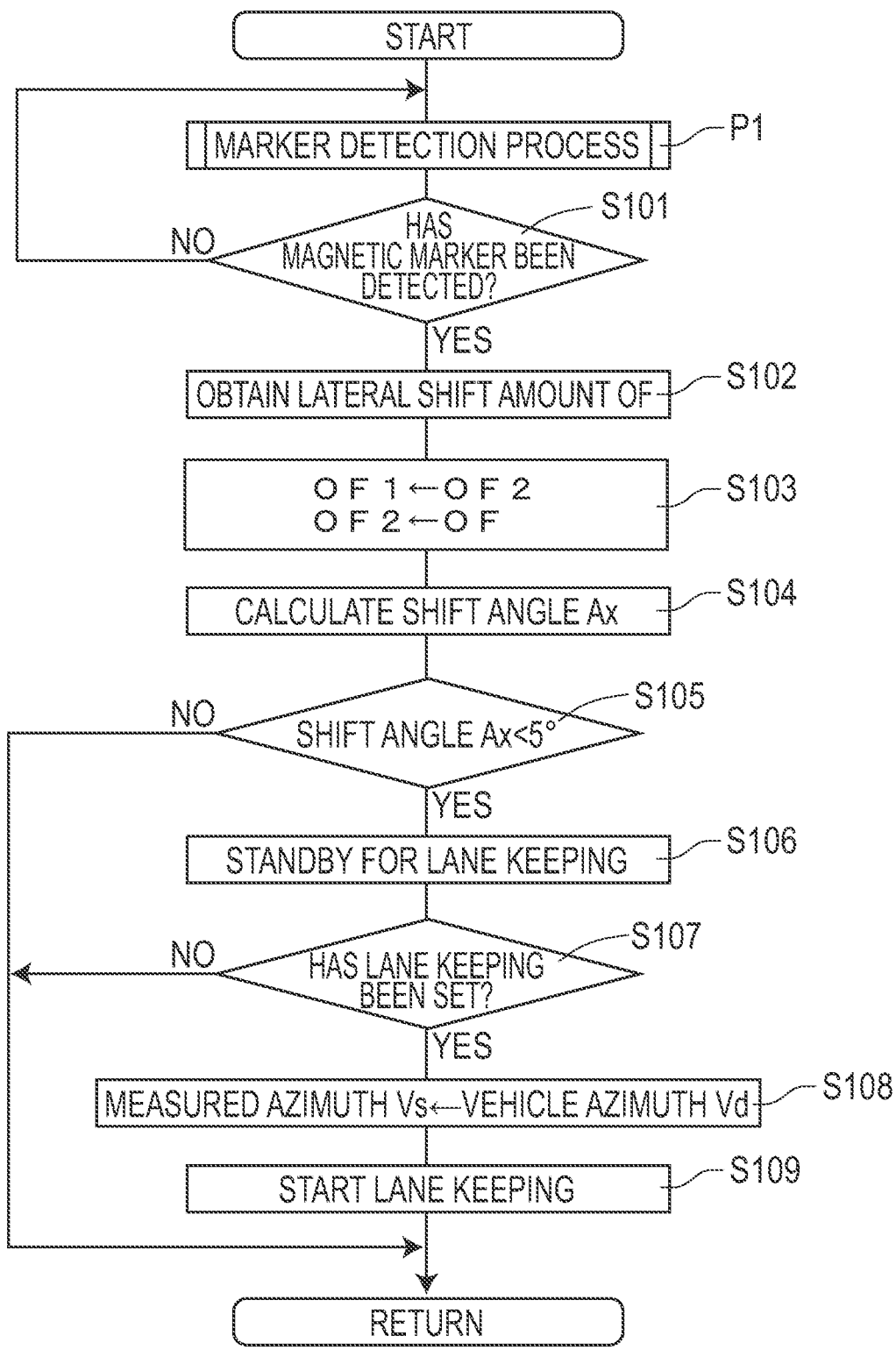

[FIG. 9]
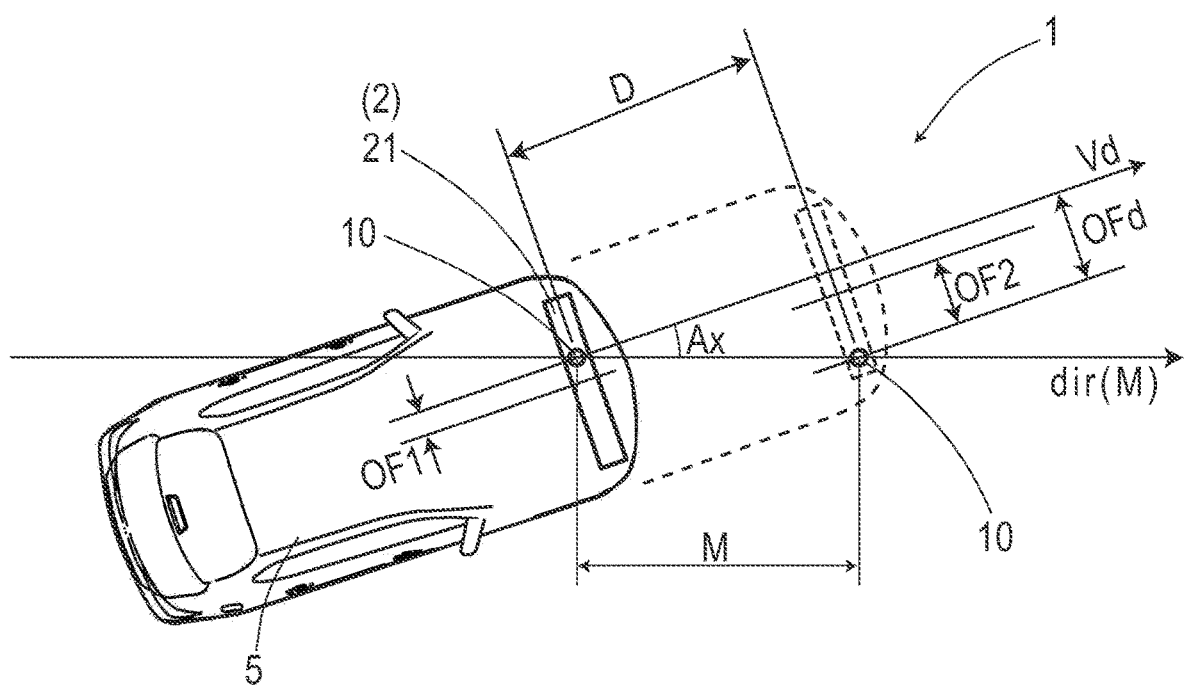

[FIG. 10]
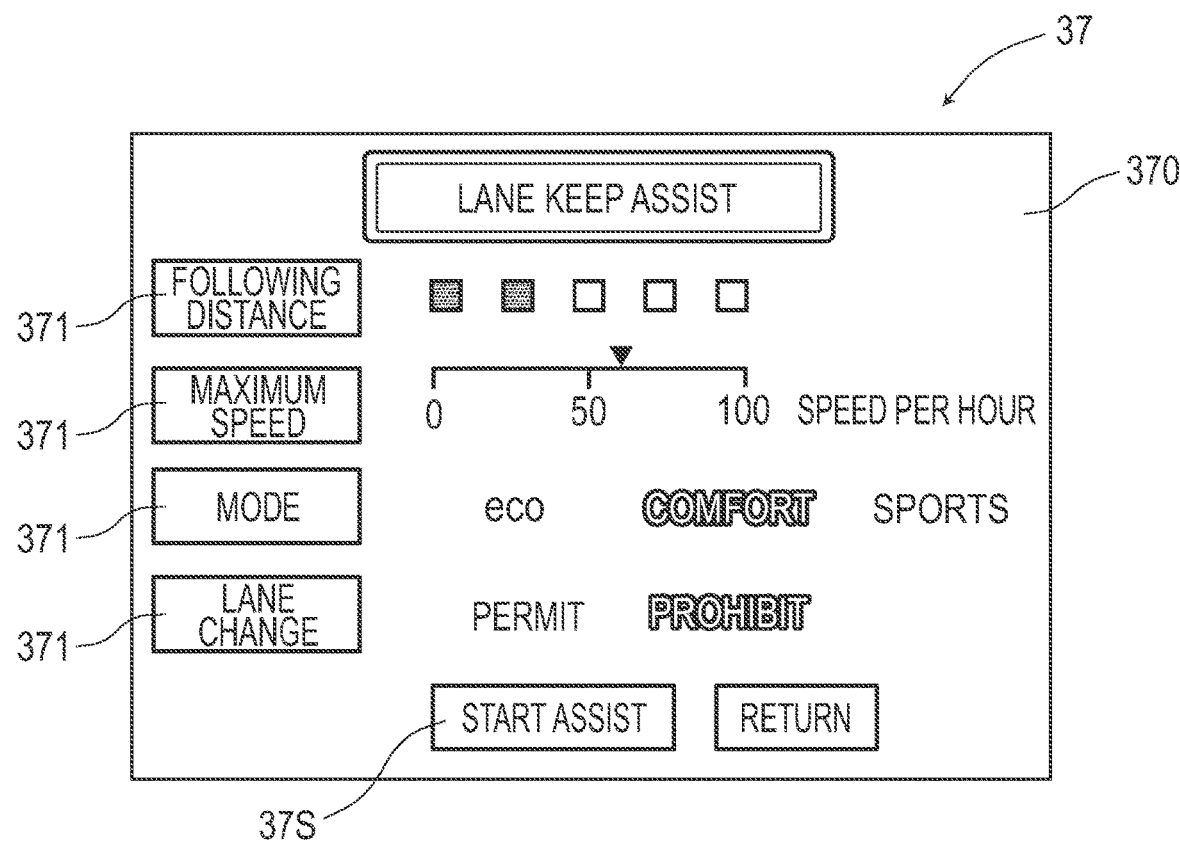

[FIG. 11]
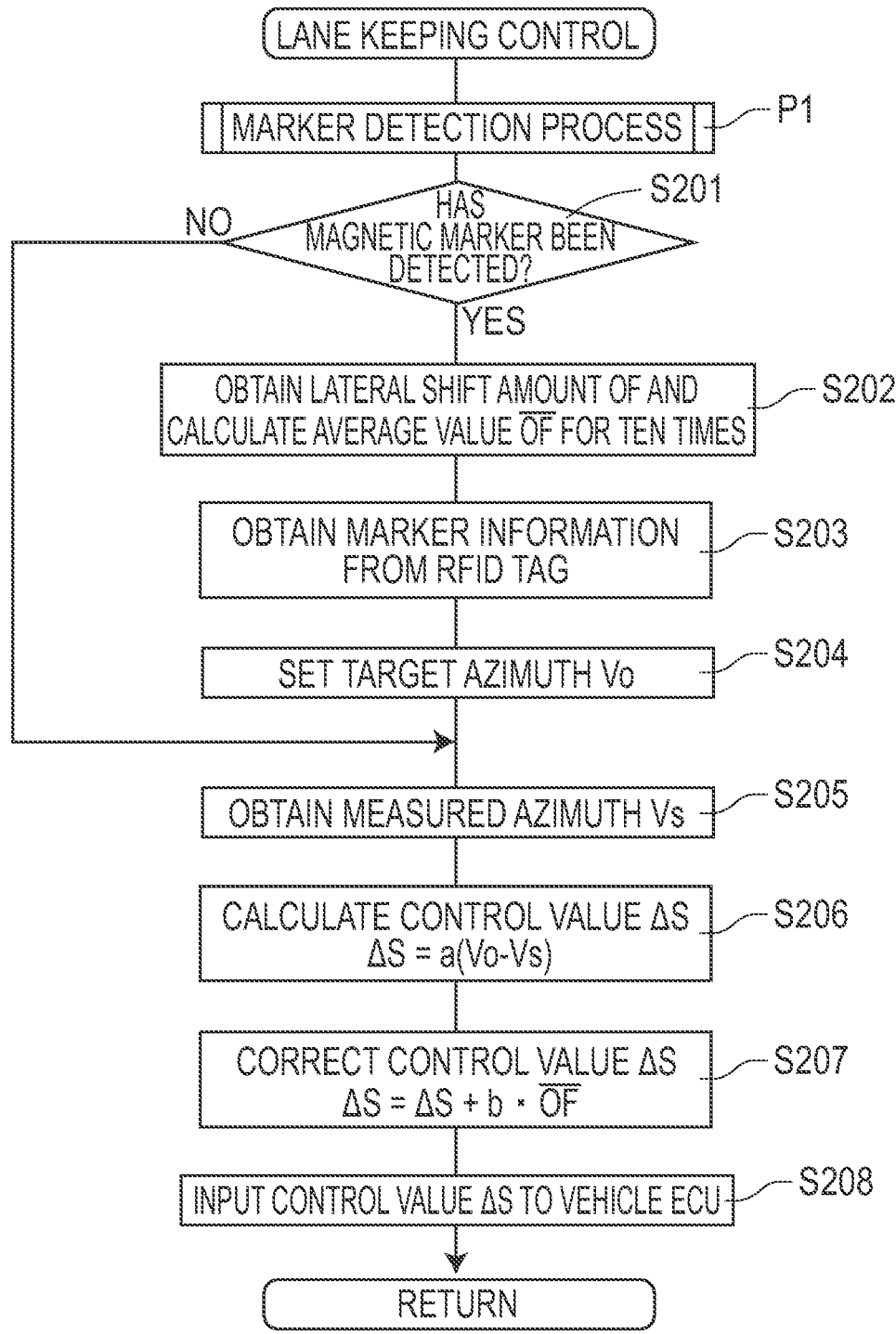

[FIG. 12]
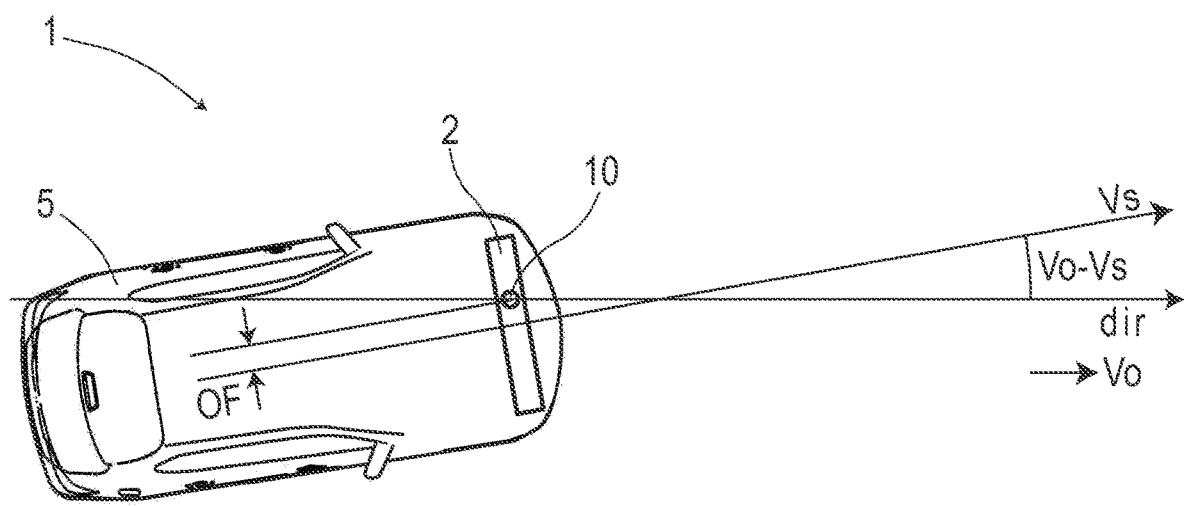

[FIG. 13]
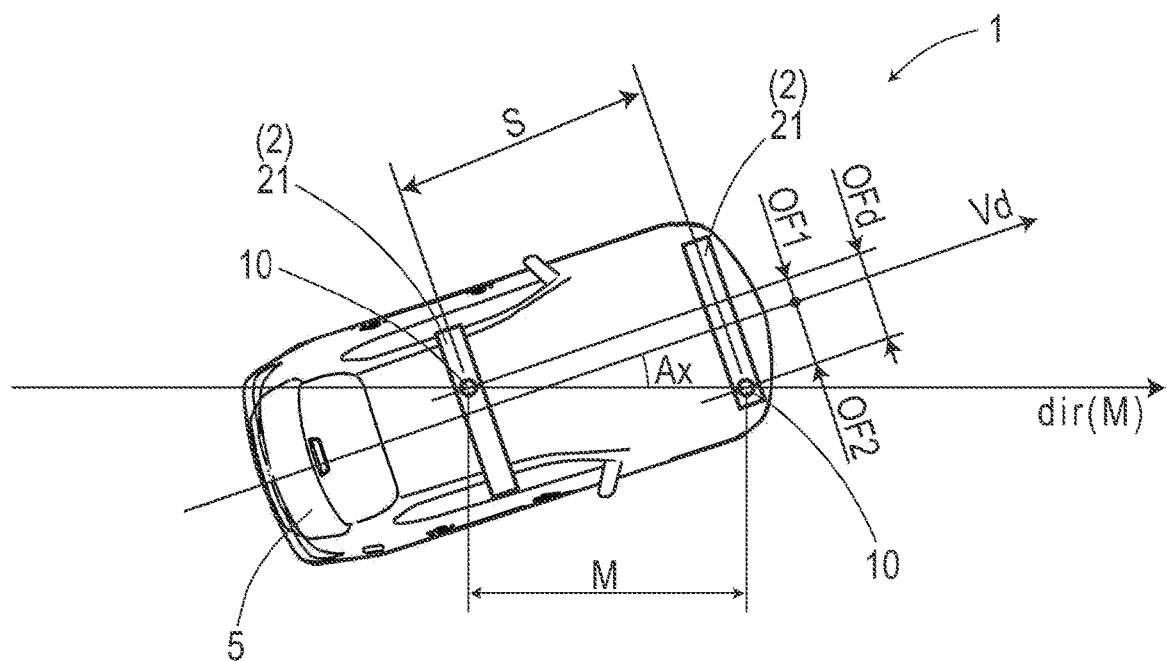

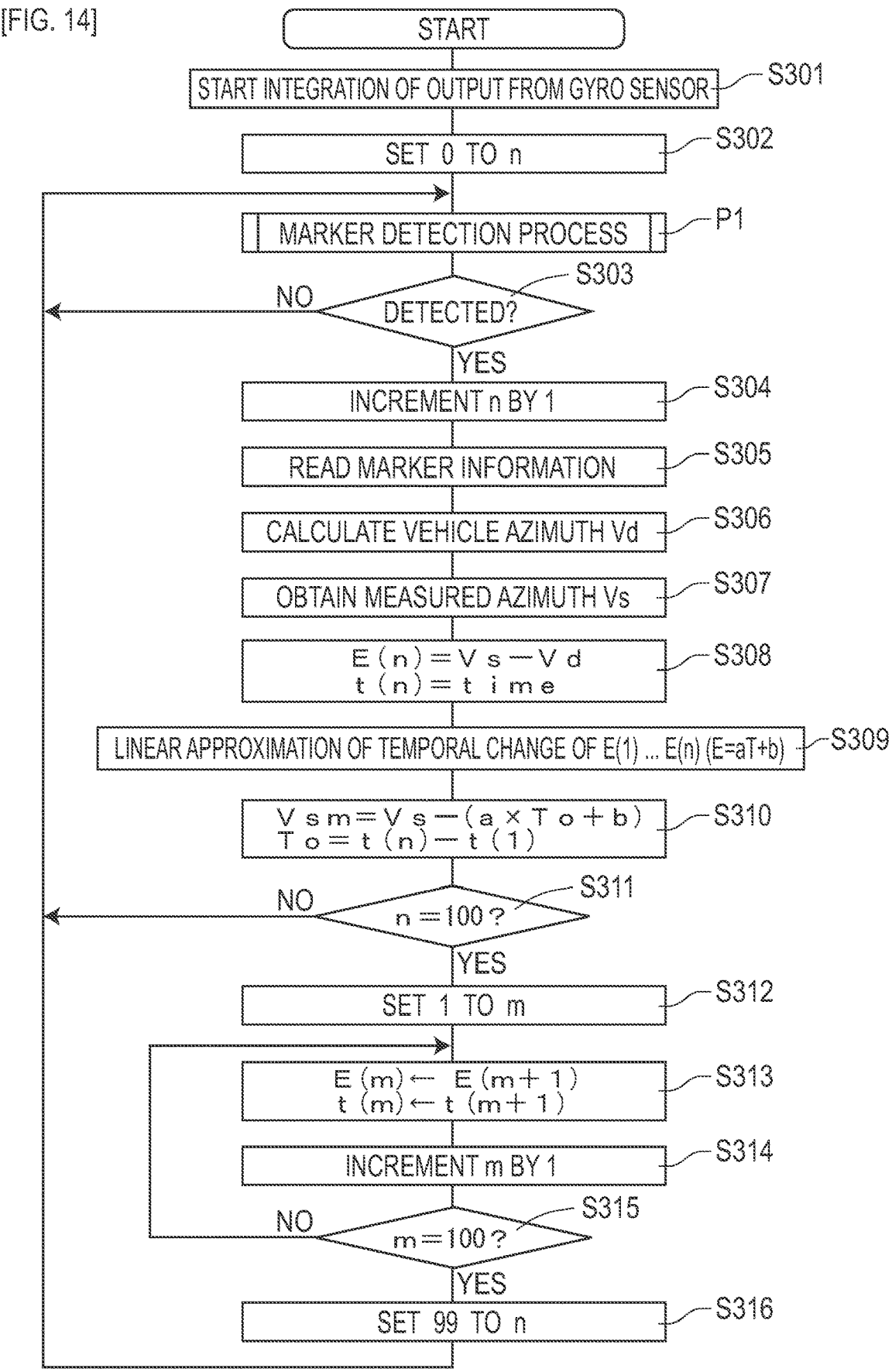
[FIG. 14]

[FIG. 15]
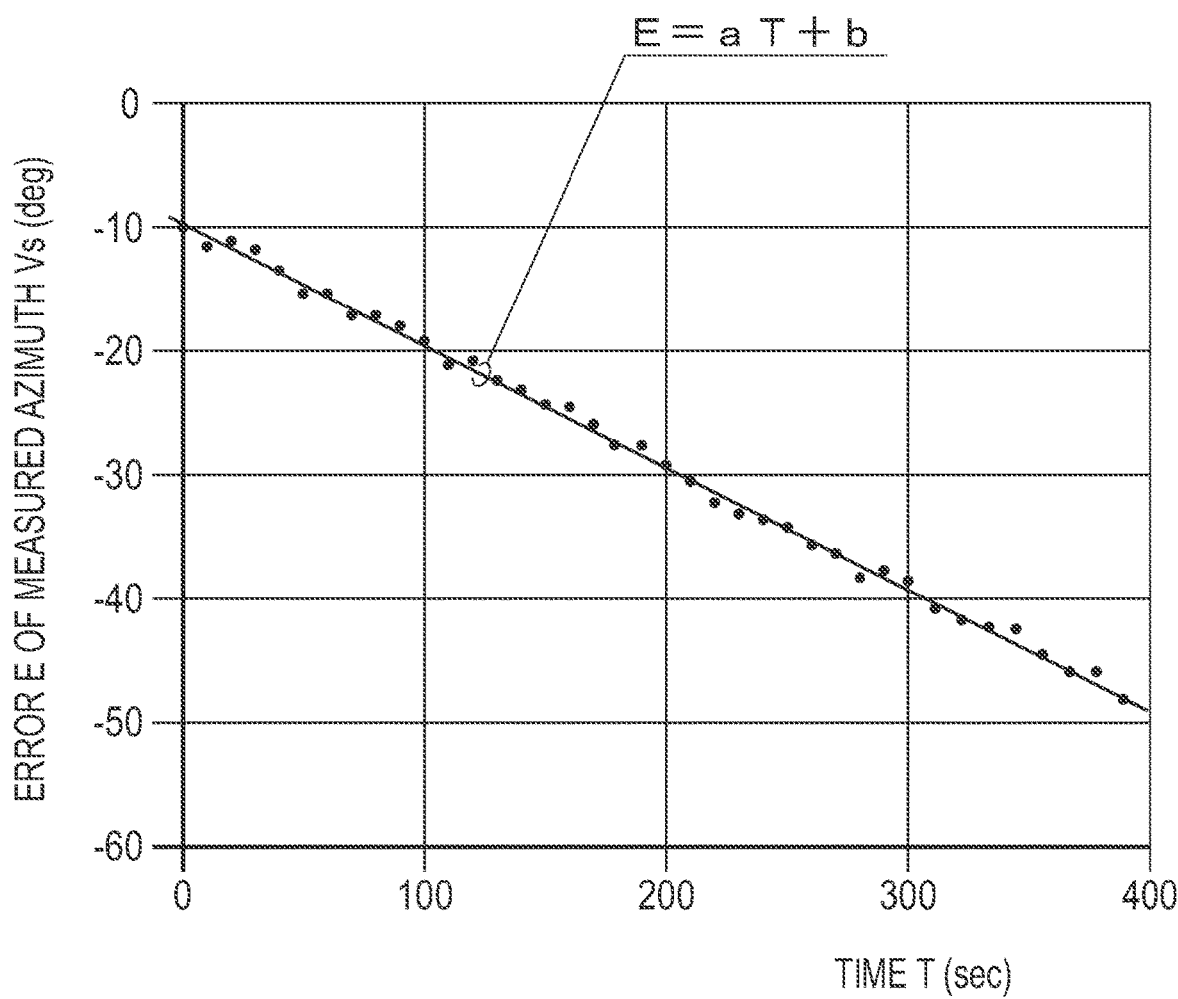

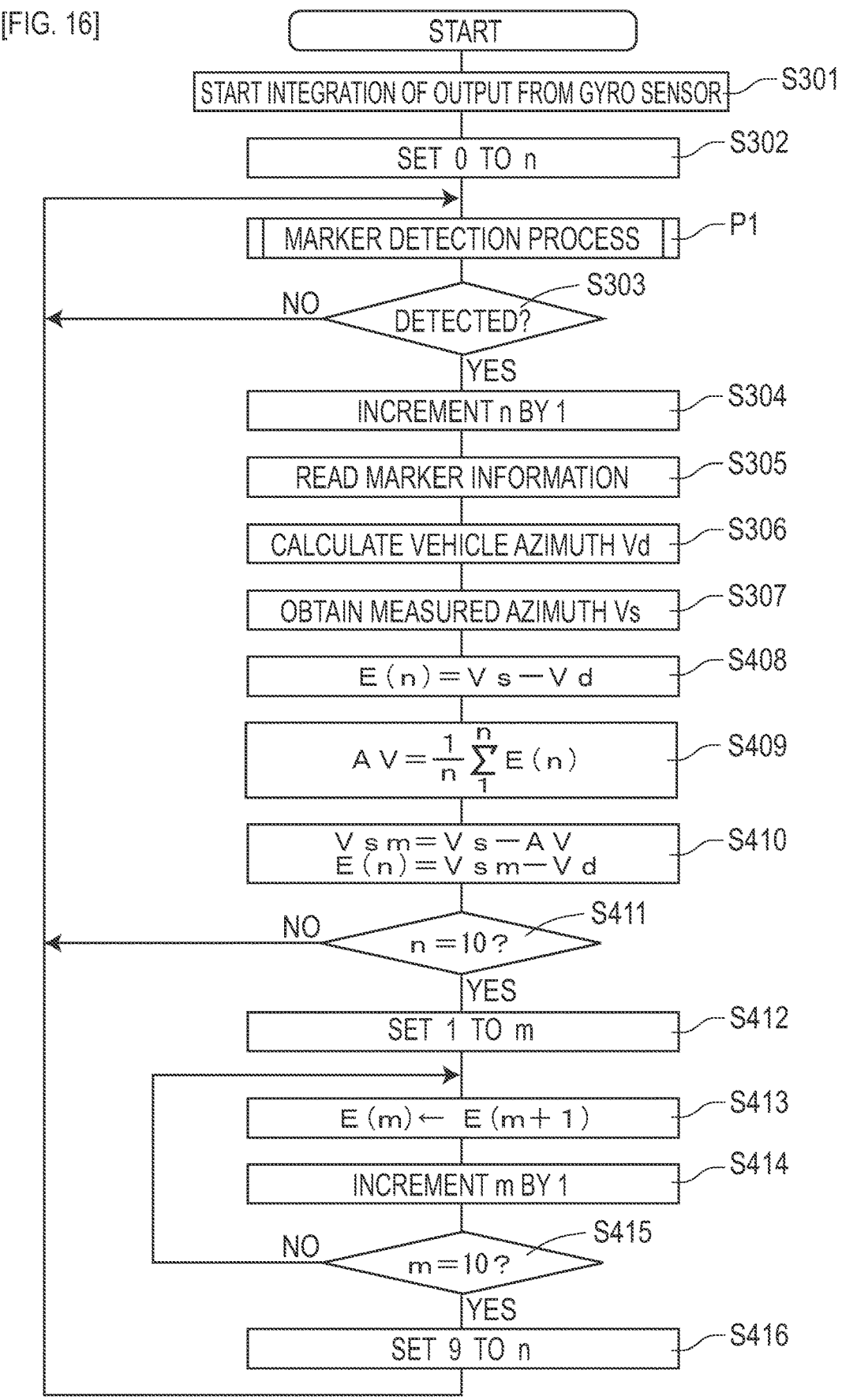

VEHICLE TRAVELING CONTROL METHOD AND VEHICLE CONTROL SYSTEM

TECHNICAL FIELD

The present invention relates to a control method and control system for causing a vehicle to travel by using magnetic markers.

BACKGROUND ART

Conventionally, an automatic steering device which causes a vehicle to travel along a lane has been suggested (for example, refer to Patent Literature 1 below). This automatic steering device is a device which automatically steers the vehicle by using a lateral shift amount of the vehicle with respect to each of magnetic markers arrayed along the center of the lane.

CITATION LIST

Patent Literature

Patent Literature 1: Japanese Unexamined Patent Application Publication No. 2005-202478

SUMMARY OF INVENTION

Technical Problem

However, the above-described automatic steering control has the following problems. That is, positional errors, which are inevitable in laying the magnetic markers, directly lead to errors in the lateral shift amount to be detected by the vehicle, and there is a possibility of impairing smooth traveling by automatic steering. To avoid this possibility, to achieve a laying position with high accuracy, there is a problem in which cost of construction of magnetic markers arises.

The present invention was made in view of the above-described conventional problem, and is to provide a traveling control method and vehicle control system for causing a vehicle to smoothly travel along a traveling road where magnetic markers are arrayed.

Solution to Problem

One mode of the present invention resides in a vehicle traveling control method for causing a vehicle to travel along a traveling road where markers are arrayed, including:

an azimuth measuring process of measuring a vehicle azimuth indicating an orientation of the vehicle;

a control process of controlling the vehicle so that a measured azimuth, which is the vehicle azimuth measured by the azimuth measuring process, is matched with a target azimuth corresponding to a direction of the traveling road; and a correction process of correcting a degree of control by the control process, in order to bring a lateral shift amount of the vehicle with reference to each of the markers closer to zero, in accordance with the lateral shift amount or a magnitude of a physical quantity obtained by performing a process on the lateral shift amount.

One mode of the present invention resides in a vehicle control system for causing a vehicle to travel along a traveling road where markers are arrayed, including:

an azimuth measuring part which measures a vehicle azimuth, which is an orientation of the vehicle;

a control part which controls the vehicle so that a measured azimuth, which is the vehicle azimuth measured by the azimuth measuring part, is matched with a target azimuth corresponding to a direction of the traveling road; and a correcting part which corrects a degree of control by the control part, in order to bring a lateral shift amount of the vehicle with reference to each of the markers closer to zero, in accordance with the lateral shift amount or a magnitude of a physical quantity obtained by performing a process on the lateral shift amount.

Advantageous Effects of Invention

The preset invention is a vehicle traveling control method or vehicle control system which the measured azimuth regarding a gyro sensor is matched with the target azimuth. In a configuration of the present invention, direct control by the lateral shift amount with respect to the marker or the like is not performed. The lateral shift amount with respect to the marker or the like is used to correct the degree of control. Thus, in the present invention, a possibility that smooth traveling of the vehicle is inhibited due to the lateral shift amount with respect to the marker is decreased.

BRIEF DESCRIPTION OF DRAWINGS

FIG. 1 is a front view of a vehicle when looked into in a first embodiment.

FIG. 2 is a descriptive diagram of a magnetic marker in the first embodiment.

FIG. 3 is a descriptive diagram of a laying mode of magnetic markers in the first embodiment.

FIG. 4 is a front view of an RFID tag in the first embodiment.

FIG. 5 is a descriptive diagram depicting a configuration of a driving assist system in the first embodiment.

FIG. 6 is a descriptive diagram exemplarily depicting change of a magnetic measurement value in a forwarding direction at the time of passing over the magnetic marker in the first embodiment.

FIG. 7 is a descriptive diagram exemplarily depicting a distribution of magnetic measurement values in a vehicle-width direction measured by magnetic sensors Cn arrayed in the vehicle-width direction in the first embodiment.

FIG. 8 is a flow diagram depicting a flow of an entire operation of the vehicle in the first embodiment.

FIG. 9 is a descriptive diagram of a method of estimating a vehicle azimuth with reference to markers in the first embodiment.

FIG. 10 is a front view of a setting screen of a lane keeping function in the first embodiment.

FIG. 11 is a flow diagram depicting a flow of lane keeping control in the first embodiment.

FIG. 12 is a descriptive diagram of an azimuth deviation of a measured azimuth with respect to a target azimuth in the first embodiment.

FIG. 13 is a descriptive diagram of another method of estimating the vehicle azimuth with reference to the markers in the first embodiment.

FIG. 14 is a flow diagram depicting a flow of a process of correcting a measured azimuth in a second embodiment.

FIG. 15 is a descriptive diagram of a process of linear approximation of temporal change of error in measured azimuth in the second embodiment.

FIG. 16 is a flow diagram depicting a flow of a process of correcting a measured azimuth in a third embodiment.

DESCRIPTION OF EMBODIMENTS

Modes for implementation of the present invention are specifically described by using the following embodiments.

First Embodiment

The present embodiment is an example for a traveling control method and a vehicle control system to achieve lane keeping for causing vehicle 5 to travel along a lane where magnetic markers 10 are arrayed. Details of this are described by using FIG. 1 to FIG. 13.

Driving assist system 1, which is one example of the vehicle control system, is configured to include, as in FIG. 1, measuring unit 2 which performs magnetic detection and so forth, tag reader 34 which obtains marker information regarding magnetic markers 10, control unit 32 which controls operation of the entire system, vehicle ECU 36, and so forth. Vehicle ECU 36 controls steering actuator 361 for steering the wheels to be steered based on a control signal inputted from control unit 32.

In the following, magnetic marker 10 to be laid in a road is generally described, and then details of measuring unit 2, tag reader 34, and control unit 32 are described.

Magnetic marker 10 is, as in FIG. 1 to FIG. 3, an example of a marker to be laid in road surface 100S of the road (one example of a traveling road) where vehicle 5 travels. This magnetic marker 10 forms a columnar shape having a diameter of 20 mm and a height of 28 mm. Magnetic marker 10 is laid, for example, in a state of being accommodated in a hole provided in road surface 100S (FIG. 1). A magnet forming magnetic marker 10 is a ferrite plastic magnet with magnetic powder of iron oxide as a magnetic material dispersed in a polymer material as a base material. This magnet has a property of a maximum energy product (BHmax)=6.4 kJ/m$^3$.

Specifications of magnetic marker 10 of the present embodiment are partially depicted in Table 1.

TABLE 1

| | |
|---|---|
| Magnet type | Ferrite plastic magnet |
| Diameter | φ 20 mm |
| Height | 28 mm |
| Magnetic flux density Gs of the surface | 45 mT |

This magnetic marker 10 acts with magnetism of a magnetic flux density of 8 μT (microtesla) at an upper-limit height of 250 mm in a range from 100 mm to 250 mm assumed as an attachment height of measuring unit 2. Also, in this magnetic marker 10, a magnetic flux density Gs of the surface indicating a magnetic strength on the surface is 45 mT.

Magnetic markers 10 are arranged, as in FIG. 3, along the center of lane 100 sectioned by left and right lane marks at pitches of, for example, 2 meters (marker span M). Although details will be described further below, in driving assist system 1, a vehicle azimuth (orientation of the vehicle in a longitudinal direction, azimuth) with reference to the markers is estimated on a precondition that a direction of a line segment connecting adjacent two magnetic markers 10 are along a lane direction.

Note that a designed laying position of each magnetic marker 10 is at the center of lane 100. Therefore, the direction of the line segment connecting adjacent two magnetic markers 10 is designed to match the lane direction (direction of the traveling road). However, in practice, an error in a laying position of magnetic marker 10 is inevitable. Thus, a direction of the actual line segment connecting adjacent two magnetic markers 10 has an azimuth error, and is deviated from the lane direction. In the following, both are distinguished, and the lane direction is referred to as azimuth dir and the direction of the actual line segment connecting adjacent two magnetic markers 10 is referred to as azimuth dir(M).

To an upper end face of magnetic marker 10, RFID (Radio Frequency IDentification) tag 15 is attached as a wireless tag which wirelessly outputs information (refer to FIG. 2). RFID tag 15, which is one example of an information providing part, operates by wireless external power feeding, and transmits marker information regarding magnetic marker 10. Marker information includes position data indicating the designed laying position of its corresponding magnetic marker 10, azimuth data (azimuth information, azimuth dir) indicating the lane direction, and so forth.

Note that if laying positions (absolute positions) of adjacent two magnetic markers 10 are known, azimuth dir indicating the lane direction can be found by calculation (target azimuth setting process, target azimuth setting part). The position data indicating the laying positions of adjacent two magnetic markers 10 may be included as azimuth information in the marker information. Alternatively, a laying position of immediately-previous magnetic marker 10 may be stored in advance on a vehicle 5 side and the laying position of immediately-previous magnetic marker 10 may be read when azimuth dir is calculated. In this case, the laying position of one magnetic marker 10 included in the marker information is one example of azimuth data (azimuth information).

RFID tag 15 forming one example of the information providing part is an electronic component having IC chip 157 implemented on a surface of tag sheet 150 (FIG. 4) cut out from, for example, a PET (PolyEthylene Terephthalate) film. On the surface of tag sheet 150, a printed pattern of loop coil 151 and antenna 153 is provided. Loop coil 151 is a receiving coil where an exciting current is generated by external electromagnetic induction. Antenna 153 is a transmission antenna for wirelessly transmitting marker information. RFID tag 15 is arranged on an upward-oriented end face of magnetic marker 10.

Next, measuring unit 2, tag reader 34, and control unit 32 included in vehicle 5 are described.

Measuring unit 2 is, as in FIG. 5, a unit having sensor array 21 as a magnetic detecting part and IMU (Inertial Measurement Unit) 22 integrated together. Measuring unit 2 having a narrow rod shape is attached to, for example, the inside of front bumper or the like, in a state of facing road surface 100S (refer to FIG. 1). In the case of vehicle 5 of the present embodiment, the attachment height of measuring unit 2 with reference to road surface 100S is 200 mm.

Sensor array 21 of measuring unit 2 includes fifteen magnetic sensors Cn (n is an integer of 1 to 15) arrayed on one straight line and detection processing circuit 212 having a CPU and so forth not depicted incorporated therein. In sensor array 21, fifteen magnetic sensors Cn are equidistantly arranged with 10-centimeter pitches. Measuring unit 2 is attached to vehicle 5 so that an array direction of magnetic sensors Cn in sensor array 21 matches a vehicle-width direction.

Magnetic sensors Cn are sensors which detect magnetism by using the known MI effect (Magneto Impedance Effect)

in which impedance of a magneto-sensitive body such as an amorphous wire sensitively changes in response to an external magnetic field. In magnetic sensors Cn, magneto-sensitive bodies are arranged along two orthogonal axial directions, thereby allowing detection of magnetism acting on the two orthogonal axial directions. Note in the present embodiment that magnetic sensors Cn are incorporated in sensor array 21 so that magnetic components in a forwarding direction and magnetic components in the vehicle-width direction can be detected.

Magnetic sensors Cn are highly-sensitive sensors having a measurement range of the magnetic flux density of ±0.6 mT and a magnetic flux resolution of 0.02 µT within the measurement range. In the present embodiment, a frequency of magnetic measurement by each magnetic sensor Cn of measuring unit 2 is set at 3 kHz so as to support high-speed traveling of vehicle 5.

Specifications of magnetic sensor Cn are partially depicted in Table 2.

TABLE 2

| Measurement range | ±0.6 mT |
|---|---|
| Magnetic flux resolution | 0.02 µT |
| Sampling frequency | 3 kHz |

As described above, magnetic marker 10 can act with magnetism having the magnetic flux density equal to or larger than 8 µT in the range from 100 mm to 250 mm assumed as the attachment height of magnetic sensors Cn. Magnetic marker 10 acting with magnetism having the magnetic flux density equal to or larger than 8 µT can be detected with high reliability by using magnetic sensors Cn having the magnetic flux resolution of 0.02 µT.

Detection processing circuit 212 (FIG. 5) of sensor array 21 is an arithmetic circuit which performs marker detection process for detecting magnetic marker 10 and so forth. This detection processing circuit 212 is configured by using a CPU (Central Processing Unit) which performs various calculations, memory elements such as a ROM (Read Only Memory) and a RAM (Random Access Memory), and so forth.

Detection processing circuit 212 obtains a sensor signal outputted from each of magnetic sensors Cn at the frequency of 3 kHz to perform marker detection process. Detection processing circuit 212 inputs detection result of the marker detection process to control unit 32. Although details will be described further below, in this marker detection process, in addition to detection of magnetic marker 10, a lateral shift amount detection process is performed, in which a lateral shift amount of vehicle 5 with respect to detected magnetic marker 10 is measured.

IMU 22 (FIG. 5) incorporated in measuring unit 2 is an inertial navigation unit which estimates a relative position of vehicle 5 by inertial navigation. IMU 22 includes magnetic sensor 221 as an electronic compass which measures the azimuth, acceleration sensor 222 which measures acceleration, gyro sensor 223 which measures angular velocity, and so forth. Gyro sensor 223 measures angular velocity in a rotating direction about an axis in a vertical direction and outputs the angular velocity as a sensor output.

IMU 22 calculates a displacement amount by double integration of the acceleration and integrates displacement amounts along the vehicle azimuth, thereby calculating a relative position with respect to a reference position. By using the relative position estimated by IMU 22, it is possible to estimate an own vehicle position also when vehicle 5 is positioned in an intermediate position between adjacent two magnetic markers 10.

Furthermore, IMU 22 (one example of an azimuth measuring part and a generation processing part) temporarily integrates angular velocity (sensor output) measured by gyro sensor 223, thereby calculating measured azimuth Vs, which is a measured value of the vehicle azimuth (azimuth measuring process).

Tag reader 34 is a communication unit which wirelessly communicates with RFID tag 15 arranged on a surface of magnetic marker 10. Tag reader 34 (one example of an information obtaining part) wirelessly transmits electric power required for operation of RFID tag 15, and receives marker information transmitted from RFID tag 15. As marker information, as described above, there are position data indicating the laying position (absolute position) of corresponding magnetic marker 10, azimuth dir which is azimuth data (azimuth information) indicating the lane direction, and so forth.

Control unit 32 is a unit which controls measuring unit 2 and tag reader 34 and calculates a control value for lane keeping. The control value calculated by control unit 32 is inputted to vehicle ECU 36 which controls steering actuator 361. Control unit 32 includes an electronic substrate (omitted in the drawing) having implemented thereon a CPU which performs various computations, memory elements such as a ROM and a RAM, and so forth.

Next, (1) marker detection process, (2) lane keeping function starting process, and details of (3) lane keeping control of the present embodiment are described.

(1) Marker Detection Process

The marker detection process is a process to be performed by sensor array 21 of measuring unit 2. Sensor array 21 performs marker detection process at the frequency of 3 kHz by using magnetic sensors Cn.

As described above, magnetic sensor Cn is configured to measure magnetic components in the forwarding direction and magnetic components in the vehicle-width direction of vehicle 5. For example, when this magnetic sensor Cn moves in the forwarding direction to pass directly above magnetic marker 10, the magnetic measurement value in the forwarding direction has its sign reversed before and after passing magnetic marker 10 as in FIG. 6 and changes so as to cross zero at a position directly above magnetic marker 10. Therefore, during traveling of vehicle 5, when zero-cross Zc occurs in which the sign of the magnetic measurement value in the forwarding direction detected by any magnetic sensor Cn is reversed, it can be determined that measuring unit 2 is positioned directly above magnetic marker 10. Detection processing circuit 212 determines that magnetic marker 10 is detected when measuring unit 2 is positioned directly above magnetic marker 10 and zero-cross of the magnetic measurement value in the forwarding direction occurs as described above.

Also, for example, as for a magnetic sensor with the same specification as that of magnetic sensor Cn, a movement along a virtual line in the vehicle-width direction passing directly above magnetic marker 10 is assumed. In this case, the magnetic measurement value in the vehicle-width direction has its sign reversed on both sides across magnetic marker 10 and changes so as to cross zero at a position directly above magnetic marker 10. In the case of measuring unit 2 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10 (FIG. 7).

Based on a distribution curve of FIG. 7 exemplarily depicting magnetic measurement values in the vehicle-width direction of each of magnetic sensors Cn of measuring unit 2, it is possible to identify a position of magnetic marker 10 in the vehicle-width direction by using zero-cross Zc where the sign of the magnetic measurement value in the vehicle-width direction is reversed. When zero-cross Zc is positioned in an intermediate position (not limited to the center) between adjacent two magnetic sensors Cn, the intermediate position between adjacent two magnetic sensors Cn across zero-cross Zc is the position of magnetic marker 10 in the vehicle-width direction. Alternatively, when magnetic sensor Cn is present in which the magnetic measurement value in the vehicle-width direction is zero and the signs of the magnetic measurement values of magnetic sensors Cn on both outer sides are reversed, a position directly below that magnetic sensor Cn is the position of magnetic marker 10 in the vehicle-width direction. Detection processing circuit 212 measures a deviation of the position of magnetic marker 10 in the vehicle-width direction with respect to the center position (position of magnetic sensor C8) of measuring unit 2 as the lateral shift amount of vehicle 5 with respect to magnetic marker 10 (lateral shift amount detection process). For example, in the case of FIG. 7, the position of zero-cross Zc is a position corresponding to C9.5 in the neighborhood of a midpoint between C9 and C10. As described above, since the pitch between magnetic sensors C9 and C10 is 10 cm, the lateral shift amount of magnetic marker 10 is (9.5−8)×10 cm with reference to C8 positioned at the center of measuring unit 2 in the vehicle-width direction. Then, the lateral shift amount, which is a deviation of vehicle 5 in the vehicle-width direction with reference to magnetic marker 10, can be calculated by reversing the sign of the above-described deviation (lateral shift amount detection process). Measuring unit 2 inputs, to control unit 32, the lateral shift amount with its sign reversed in accordance with to which side, left or right, vehicle 5 is shifted with respect to magnetic marker 10.

(2) Lane Keeping Function Starting Process

Next, with reference to FIG. 8 and FIG. 9, the lane keeping function starting process by control unit 32 is described.

While vehicle 5 is traveling, control unit 32 repeatedly performs marker detection process P1 (S101: NO). When magnetic marker 10 is detected (S101: YES), control unit 32 obtains the above-described lateral shift amount from measuring unit 2 (S102). Control unit 32 handles the lateral shift amount obtained from measuring unit 2 as lateral shift amount OF of vehicle 5 with reference to magnetic marker 10.

Of lateral shift amounts OF with respect to adjacent two magnetic markers 10, control unit 32 replaces data of lateral shift amounts OF1 and OF2 as occasion arises so that temporally-obsolete one is lateral shift amount OF1 and temporarily-new one is lateral shift amount OF2 (S103). By using lateral shift amounts OF1 and OF2 with respect to adjacent two magnetic markers 10, control unit 32 calculates shift angle Ax of vehicle azimuth Vd with respect to direction dir(M) of the line segment connecting adjacent two magnetic markers 10 (S104, refer to FIG. 9).

Here, a method of calculating shift angle Ax at step S104 is described with reference to FIG. 9. Control unit 32 calculates shift angle Ax by using lateral shift amounts OF1 and OF2 with respect to adjacent two magnetic markers 10. Lateral shift amounts OF1 and OF2 are defined so as to have a positive or a negative value by taking the center of vehicle 5 in the vehicle-width direction as a boundary.

As in FIG. 9, control unit 32 calculates shift angle Ax of vehicle azimuth Vd with respect to direction dir(M) of the line segment connecting two magnetic markers 10 based on lateral shift amounts OF1 and OF2 with respect to adjacent two magnetic markers 10 as follows.

Change in lateral shift amount $OFd=|OF2-OF1|$

Shift angle $Ax=\arcsin(OFd/M)$

Direction dir(M) of the actual line segment connecting adjacent two magnetic markers 10 is the absolute azimuth having an error in azimuth shift due to the error in the laying positions of magnetic markers 10. Since this azimuth shift error is indefinite, in the azimuth estimation process of the present embodiment, vehicle azimuth Vd with reference to the markers is estimated as follows, with reference to azimuth dir (marker information), which is a design value of the direction dir(M) of the line segment.

Vehicle azimuth $Vd=dir+Ax$

In this azimuth estimation process, shift angle Ax obtained with reference to direction dir(M) of the actual line segment connecting adjacent two magnetic markers 10 is added to azimuth dir (marker information), which is the design value of the lane direction, thereby obtaining vehicle azimuth Vd with reference to the markers. Therefore, this vehicle azimuth Vd with reference to the markers includes influence of positional errors of magnetic markers 10.

After obtaining shift angle Ax in this manner, control unit 32 applies a threshold process to shift angle Ax (S105). When shift angle Ax is smaller than 5 degrees (S105: YES), control unit 32 determines that vehicle 5 is in a state of traveling along the lane, and sets a standby state of the lane keeping function (S106). During this standby state, control unit 32 causes a display (omitted in the drawing) indicating that the lane keeping control can be started to be displayed on, for example, a screen of vehicle-onboard monitor 37 (FIG. 5, FIG. 10) where touch operation can be performed. For example, when a driver performs touch operation on the screen where it is displayed that the lane keeping control can be started, the screen of vehicle-onboard monitor 37 is switched to setting screen 370 (FIG. 10) for the lane keeping control. Arranged on setting screen 370 are, for example, menu items 371 for setting a following distance, maximum speed, a traveling mode, whether to perform a lane change, and so forth; start button 37S for starting the lane keeping control, and so forth.

For example, when the lane keeping function is set by touch operation on start button 37S on setting screen 370 (FIG. 10) (S107: YES), control unit 32 sets vehicle azimuth Vd with reference to the markers estimated as in FIG. 9 as an initial value of measured azimuth Vs measured by IMU 22 (S108), and then start the lane keeping control (S109). During execution of the lane keeping control, by taking measured azimuth Vs set at step S108 as an initial value, temporal integration of measured angular velocity measured by gyro sensor 223 is performed, and measured azimuth Vs is calculated as occasion arises (azimuth measuring process).

(3) Lane Keeping Control

During execution of the lane keeping control exemplarily depicted in FIG. 11, control unit 32 repeatedly performs marker detection process P1. When magnetic marker 10 is detected (S201: YES), control unit 32 obtains lateral shift amount OF of vehicle 5 with respect to magnetic marker 10 from measuring unit 2, and obtains average lateral shift amount OFbar by a process of calculating an average value of lateral shift amounts OF for previous ten times (S202). Note that this process of obtaining average lateral shift amount OFbar by averaging lateral shift amounts OF forms one example of a temporal filtering process of attenuating high-frequency components of change in the lateral shift amount. For temporal change of the lateral shift amount, a filter process by a low-pass filter may be applied to attenuate high-frequency components.

Furthermore, control unit 32 uses tag reader 34 to obtain marker information of RFID tag 15 attached to magnetic marker 10 (S203, information obtaining process). As described above, included in this marker information is azimuth dir, which is azimuth data indicating the lane direction. Control unit 32 (one example of a target azimuth setting part) sets azimuth dir, which is an absolute azimuth, as target azimuth Vo for the lane keeping control (S204, target azimuth setting process). On the other hand, when no magnetic marker 10 is detected (S201: NO), control unit 32 bypasses the processes from steps S202 to S204 described above. In this case, target azimuth Vo set at the immediately-previous magnetic marker detection is retained as being unchanged.

After setting target azimuth Vo as described above, control unit 32 obtains measured azimuth Vs measured by IMU 22 (S205, azimuth measuring process). This measured azimuth Vs is an absolute azimuth calculated in the lane keeping function starting process exemplarily depicted in FIG. 8. In this starting process, by taking vehicle azimuth Vd with reference to the markers as the initial value of measured azimuth Vs (refer to S108 in FIG. 8), measured azimuth Vs is calculated by temporal integration of angular velocity, which is sensor output of gyro sensor 223.

Control unit 32 multiplies azimuth deviation (Vo-Vs) (refer to FIG. 12) of measured azimuth Vs with reference to target azimuth Vo by coefficient "a", thereby calculating control value ΔS (S206). Furthermore, control unit 32 forming one example of a correcting part uses average lateral shift amount OFbar obtained at step S202 described above to perform correction of control value ΔS, which is an example of a degree of control (S207, correction process). Specifically, a correction amount obtained by multiplying average lateral shift amount OFbar, which is one example of a physical quantity based on lateral shift amounts OF, by correction coefficient "b" is added to control value ΔS to obtain new control value ΔS. This correction value acts so that lateral shift amount OF becomes closer to zero.

Control unit 32 forming one example of a control part inputs this control value ΔS as the control signal to vehicle ECU 36 (S208, control process). Vehicle ECU 36 performs control on steering actuator 361 and so forth in accordance with inputted control value ΔS, thereby achieving automatic traveling of vehicle 5 by lane keeping.

As described above, the traveling control method for vehicle 5 of the present embodiment is a traveling control method for achieving lane keeping by matching measured azimuth Vs regarding gyro sensor 223 with target azimuth Vo. This traveling control method has one of the technical features in that direct control by the lateral shift amount of vehicle 5 with respect to magnetic marker 10 is not performed. An advantageous effect obtained by this technical feature is described.

In practice, positional errors in laying magnetic markers 10 are inevitable. Actual laying positions of magnetic markers 10 vary in a range on the order of ±10 cm with reference to a designed laying line. For example, even if vehicle 5 travels along the lane with high accuracy, due to an error in the laying position of each magnetic marker 10, the lateral shift amount of vehicle 5 with respect to magnetic marker 10 is not zero, and an error occurs. If this error occurs in the lateral shift amount, by the error in the lateral shift amount, unnecessary steering control is induced on the vehicle 5 side. With occurrence of this unnecessary steering control, smooth following travel along the lane cannot be achieved.

To achieve smooth following travel irrespectively of errors in the laying positions of magnetic markers 10, conventionally, schemes have been conventionally adopted, such as setting a control gain with respect to the lateral shift amount smaller, obtaining a temporal average of lateral shift amounts, and performing filter process such as applying a low-pass filter to temporal change of the lateral shift amount. These scheme are to suppress unnecessary steering control derived from an error in the lateral shift amount by blunting reaction of vehicle 5 with respect to the lateral shift amount. However, if the reaction of vehicle 5 is blunted, a delay in reaction at the time of entry from a straight road to a curved road or the like occurs, impairing controllability.

On the other hand, the traveling control method of the present embodiment is based on control of bringing measured azimuth Vs measured by IMU 22 closer to target azimuth Vo based on azimuth dir indicating the lane direction. In this control, deviation (Vo−Vs) of measured azimuth Vs with respect to target azimuth Vo is a direct control target. Thus, in this traveling control method, degree of influence of the errors in the laying positions of magnetic markers 10 on the control is small. Also in this traveling control method, a temporal average process or the like is not applied to measured azimuth Vs, and thus a delay in control with respect to a change in target azimuth Vo is small and followability with respect to a change in curvature of the lane is not impaired.

In the traveling control method of the present embodiment, in setting the initial value of measured azimuth Vs to be calculated by integration calculation by IMU 22 and correcting the degree of control, magnetic markers 10 are utilized. When the lane keeping control is started, vehicle azimuth Vd with reference to the markers is set as the initial value of measured azimuth Vs measured by IMU 22. Also in the traveling control method of the present embodiment, the control value is corrected by the lateral shift amount with respect to magnetic marker 10. If the control value (degree of control) for matching measured azimuth Vs with target azimuth Vo is corrected with the lateral shift amount, the deviation of vehicle 5 in the vehicle-width direction can be gradually eliminated.

In particular, in the traveling control method of the present embodiment, the control value is corrected by using average lateral shift amount OFbar, which is a temporal average value of lateral shift amount OF with respect to magnetic marker 10 for the previous ten times. Here, errors in the laying positions of magnetic markers 10 in the vehicle-width direction are dispersed almost equally to a plus side and a minus side by taking the designed laying line as a center, and can be thought as being close to zero on average. Therefore, average lateral shift amount OFbar described above is a physical quantity which has a reduced influence of the errors in the laying positions of magnetic markers 10 and reflects, with high accuracy, the deviation of vehicle 5 in the vehicle-width direction with reference to the designed laying line. By correcting the control value for the lane following control by this average lateral shift amount OFbar, it is possible to suppress the deviation of the vehicle in the vehicle-width direction with high reliability, while avoiding influence of laying errors of magnetic markers 10.

Note that the control value (degree of control) may be corrected by, in place of average lateral shift amount OFbar, for example, a physical amount obtained by performing a filter process such as a high-cut filter or a low-pass filter which attenuates high-frequency components on temporal change in the lateral shift amount. Alternatively, the control value can also be corrected by the lateral shift amount itself measured in marker detection process P1. In this case, in a configuration of obtaining a correction value by multiplying the lateral shift amount by a correction coefficient and subtracting the correction value from the control value, the correction coefficient is preferably set at a small value. With the correction coefficient having the small value, correction of the control value is moderate, meandering driving of the vehicle due to errors in the lateral shift amount can be suppressed before it happens.

In the present embodiment, magnetic markers 10 magnetically detectable as markers are exemplarily described. In place of the magnetic markers, which are active-type markers generating magnetism or the like, passive-type markers may be adopted, such as, for example, embedded tiles or prints recognizable as images.

Also in the present embodiment, an example is described in which the traveling control method is applied to the lane keeping control. Traveling control as an application target may be automatic traveling control by lane keeping, automatic traveling control for traveling along a specific road including lane changes, or almost-complete automatic traveling control including selection of a route to a destination. Even a route including lane changes, branching and merging, left and right turns at intersections, and so forth is one mode of the traveling road where markers are arrayed.

Note that vehicle 5 where sensor arrays 21 are arranged in the longitudinal direction of vehicle 5 with a pitch of 2 m (FIG. 13) may be adopted. With this vehicle 5, front and rear sensor arrays 21 can simultaneously detect adjacent two magnetic markers 10. Based on lateral shift amounts OF1 and OF2 of vehicle 5 measured for adjacent two magnetic markers 10, shift angle Ax of the vehicle azimuth with respect to direction dir(M) of the line segment connecting two magnetic markers 10 can be calculated as follows.

Change in lateral shift amount $OFd=|OF2-OF1|$

Shift angle $Ax=\arcsin(OFd/M)$

Note that azimuth dir indicating the lane direction may be obtained based on the laying positions (absolute positions) of adjacent two magnetic markers 10 and set as a target azimuth (target azimuth setting process). RFID tag 15 may be configured so as to output marker information including position information indicating the laying position of the magnetic marker. In this case, by the information obtaining process performed on a vehicle side, the marker information including the position information indicating the laying position of the magnetic marker can be read.

In the present embodiment, IMU 22 is exemplarily described as an azimuth measuring part. The configuration for measuring the vehicle azimuth is not limited to IMU 22 of the present embodiment. Other than IMU 22, the vehicle azimuth may be measured by an electronic compass using a geomagnetic sensor, a GPS compass using GPS (Global Positioning System), or the like.

Note that the target azimuth setting part of the present embodiment sets azimuth dir, which is azimuth data indicating the lane direction, as a target azimuth for the lane keeping control. That is, in a configuration of the present embodiment, azimuth dir itself, indicating the lane direction forming one example of the direction of the traveling road, is set as the target azimuth corresponding to the direction of the traveling road. In place of this, an azimuth identified based on azimuth dir indicating the lane direction may be taken as the target azimuth corresponding to the direction of the traveling road. For example, the target azimuth based on azimuth dir may be obtained by using an arithmetic equation with the degree of change in the direction of the traveling road as a variable. For example, when passing through the traveling road with a large degree of change in the direction of the traveling road with a small radius of curvature (a large curvature), such as a sharp curve or corner, a vehicle with a large inner wheel difference such as a large truck or bus is required to travel with the large turn to some extent. Thus, the direction of a path for traveling with a large turn may be set as the target azimuth corresponding to the direction of the traveling road. The large-turn path can be calculated with an arithmetic equation in which, for example, a vehicle's specification value such as a dimension of a wheel base is set as a variable.

Second Embodiment

The present embodiment is an example based on the traveling control method of the first embodiment added with a process of correcting measured azimuth Vs measured by IMU 22. Details of this are described with reference to FIG. 14 and FIG. 15.

In driving assist system 1 of the present embodiment, as with the first embodiment, lane 100 (refer to FIG. 3, traveling road) is assumed in which magnetic markers 10 are arranged at pitches of marker span M=2 m. Since magnetic markers 10 are arranged along the center of lane 100, a direction of a designed line segment connecting adjacent two magnetic markers 10 matches a lane direction. Azimuth dir indicating this lane direction is wirelessly outputted as azimuth data (part of marker information) by RFID tag 15 annexed to magnetic marker 10.

In traveling control by this driving assist system 1 such as lane keeping control, by using magnetic markers 10, vehicle azimuth Vd with reference to the markers is estimated. Then, during execution of this traveling control, measured azimuth Vs is corrected by using vehicle azimuth Vd with reference to the markers. As described in the first embodiment, vehicle azimuth Vd with reference to the markers includes an error due to an error in a laying position of magnetic marker 10. The correction process of FIG. 14 is a process of correcting measured azimuth Vs by using vehicle azimuth Vd with reference to the markers including the error.

Details of this correction process are described with reference to the flow diagram of FIG. 14. For example, when lane keeping control is started, control unit 32 controls IMU 22 so as to start integration calculation of output (angular velocity, sensor output) of gyro sensor 223 (S301). By integration calculation of sensor output, measured azimuth Vs is generated, which is a measured value of the vehicle azimuth. Also, control unit 32 sets 0, which is an initial value, to variable n for use during the process (S302).

Control unit 32 during execution of the lane keeping control controls sensor array 21 to repeatedly perform marker detection process P1 including the lateral shift amount detection process (S303: NO). When magnetic marker 10 is detected (S303: YES), control unit 32 first increments variable n by 1 (S304). Then, control unit 32 controls tag reader 34 to read the marker information from RFID tag 15 (S305, information obtaining process). As described above, included in this marker information is azimuth data (azimuth dir) in the lane direction corresponding to the direction of the designed line segment connecting two magnetic markers 10.

Subsequently, control unit 32 estimates vehicle azimuth Vd by using the lateral shift amounts with respect to magnetic markers 10 (S306, azimuth estimation process). Details of this azimuth estimation process are similar to those of the process described in the first embodiment with reference to FIG. 9. Also, control unit 32 obtains measured azimuth Vs measured by IMU 22 (S307).

Control unit 32 causes a difference between measured azimuth Vs and vehicle azimuth Vd to be stored as error E(n) of measured azimuth Vs and causes a time (current time) at the time of measurement of measured azimuth Vs to be stored as t(n) (S308, generation process). In this manner, control unit 32 generates a data string formed of a combination of error E(n) and time t(n).

Subsequently, as for change of E(1) . . . E(n) with respect to t(1) . . . t(n), that is, temporal change of E(1) . . . E(n), control unit 32 linearly approximates this temporal change by applying, for example, the least square method, to obtain a linear equation of E=aT+b, which is one example of correction information (S309, correction information generation process, refer to FIG. 15). Here, E is an angular amount representing an error of measured azimuth Vs, and T is time. Also, "a" is a gradient of an approximate straight line of E=aT+b and "b" is an intercept of the approximate straight line.

After the approximate straight line of E=aT+b is obtained by the approximation process exemplarily depicted in FIG. 15, control unit 32 calculates corrected measurement azimuth Vsm by subtracting error E (correction amount) from measured azimuth Vs (S310). By using the above-described approximate straight line, error E is (a×To+b). Here, To is time corresponding to data string E(n), and To=t(n)−t(1). By using this error E, control unit 32 obtains corrected measured azimuth Vsm=Vs−E=Vs−(a×To+b).

For example, during execution of the lane keeping control, the process of FIG. 14 is repeatedly performed, and E(n) is sequentially added until variable n reaches 100 (flow from S311: NO to S308). In a period until variable n reaches 100 (S311: NO), with data string E(n) not satisfying 100 pieces of data, linear approximation at step S309 and calculation of the corrected value at step S310 are performed.

When variable n reaches 100 and a string of 100 pieces of data E(1) . . . E(100) is formed (S311: YES), control unit 32 performs process for retaining the string of 100 pieces of data E(1) . . . E(100) as the latest data. To perform this process, control unit 32 first sets 1 to variable m (S312). Then, control unit 32 rewrites m-th error E(m) as (m+1)-th error E(m+1) and rewrites m-th time t(m) as (m+1)-th time t(m+1) (S313).

Control unit 32 increments variable m by 1 (S314) and repeats the rewrite process at step S313 until variable m reaches 100 (S315: NO). When variable m reaches 100 (S315: YES), data E(1), which is the most temporally-obsolete data of the original string of 100 pieces of data E(1) . . . E(100), is deleted, and E(2) . . . E(100) is sequentially brought down to form a string of 99 pieces of data E(1) . . . E(99). Then, control unit 32 sets 99 to variable n as preparation for the next process loop (S316), and then performs the next loop. At step S308 in the next loop, control unit 32 sets new error data to E(100) to form a string of the latest 100 pieces of data E(1) . . . E(100). Then, with the string of the latest data E(1) . . . E(100), control unit 32 performs the process of linear approximation (S309), the process of correcting measured azimuth Vs (S310), and so forth.

As described above, driving assist system 1 of the present embodiment performs correction of measured azimuth Vs by using vehicle azimuth Vd with reference to the markers. By setting corrected measured azimuth Vsm with improved accuracy as a control target, it is possible to cause vehicle 5 to travel with high accuracy by traveling control such as lane keeping control.

Here, a concept of the process of correcting measured azimuth Vs is described. If rotation in a yaw direction acting on vehicle 5 (rotation direction about an axis in the vertical direction) does not occur and its rotation amount is zero (zero point), the angular velocity measured by gyro sensor 223 is ideally zero (deg/second). However, in accordance with influence such as a temporal change or a change in temperature, the zero point of gyro sensor 223 may be deviated (drifted). If this drift occurs, the angular velocity outputted from the gyro sensor 223 is not zero at the zero point, and an erroneous offset occurs. This offset at the zero point is integrated when angular velocity is temporally integrated to obtain measured azimuth Vs and becomes apparent as an error component in measured azimuth Vs. Since the offset due to the above-described drift is nearly constant, the error derived from the offset has a value close to an amount obtained by multiplying the offset amount by a time corresponding to an integral interval. In the correction process of the present embodiment, in (a×To+b), which is the correction amount of measured azimuth Vs, the offset due to the above-described drift corresponds to "a", and To corresponds to the time corresponding to the integral interval. That is, correction amount (a×To) is an amount corresponding to time integration of offset "a" due to the drift included in the output of gyro sensor 223. In place of correction of subtracting correction amount (a×To) from measured azimuth Vs, correction of subtracting offset "a" from the output (angular velocity) of the gyro sensor may be performed and then a measured azimuth may be obtained by time integration.

The "b" portion of the correction amount of (a×To+b) to be subtracted from measured azimuth Vs is a portion corresponding to an initial value of the difference between measured azimuth Vs and vehicle azimuth Vd. By matching measured azimuth Vs with vehicle azimuth Vd at the start of the integral interval, the correction amount corresponding to "b" can be made as zero.

In the present embodiment, automatic traveling control is assumed in which the traveling road where magnetic markers 10 are arranged along the center of the lane is taken as a target and vehicle 5 is caused to travel so as to trace magnetic markers 10. Here, in practice, laying errors of magnetic markers 10 with respect to the center line of the lane are inevitable. If laying errors of magnetic markers 10 are present, direction dir(M) of an actual line segment connecting adjacent two magnetic markers is deviated from azimuth dir, which is a designed value in the lane direction. In a configuration of the present embodiment, shift angle Ax with respect to direction dir (M) of the actual line segment connecting adjacent two magnetic markers is added to azimuth dir, which is a designed lane direction, thereby estimating vehicle azimuth Vd with reference to the markers. Thus, an azimuth error in direction dir (M) of the above-described line segment is included in vehicle azimuth Vd with reference to the markers, causing an error in E(n) at step S308 (FIG. 14).

On the other hand, the azimuth error in direction dir (M) of the actual line segment connecting adjacent two magnetic markers is thought to be dispersed to both positive and negative sides with respect to the actual lane direction. Since an error in E(n) based on the azimuth error of direction dir(M) is also dispersed to both positive and negative sides, this can be relatively easily cancelled by linear approximation at step S309. Therefore, in an error of E=aT+b obtained by linear approximation of temporal change of E(n), influence of the error of the laying position of magnetic marker 10 can be suppressed. The error of E=aT+b is an error derived from the erroneous offset by the drift of gyro sensor 223 or the like and, by using E=aT+b, as described above, measurement error Vs regarding gyro sensor 223 can be corrected with high accuracy.

As described above, in a configuration of the present embodiment, measured azimuth Vs of gyro sensor 223 can be corrected by using magnetic markers 10. With an improvement in accuracy of the measured azimuth of gyro sensor 223, it is possible to improve accuracy in traveling control such as lane keeping control.

In the present embodiment, as azimuth data (azimuth information) to be included in the marker information, azimuth dir indicating a designed direction of the line segment connecting adjacent two magnetic markers 10 is exemplarily described. The azimuth information is not necessarily information of the azimuth itself. For example, a combination of the laying positions (absolute positions) of adjacent two magnetic markers 10 or the like can be one example of azimuth information which can identify the azimuth. Note that other configurations and operations and effects are similar to those of the first embodiment.

Third Embodiment

The present embodiment is an example in which, in the traveling control method of the second embodiment, details of the process of correcting measured azimuth Vs are changed. Details of this are described with reference to the flow diagram of FIG. 16. The drawing is an alternative diagram of FIG. 14, which is referred to in the second embodiment.

In the correction process (FIG. 16) to be performed during traveling control of the present embodiment, processes until vehicle azimuth Vd with reference to the markers and measured azimuth Vs are obtained (processes from S301 to S307) are similar to the processes from S301 to S307 in FIG. 14 of the second embodiment.

After vehicle azimuth Vd with reference to the markers and measured azimuth Vs are obtained, the control unit (reference sign 32 in FIG. 5) of the present embodiment obtains the difference between measured azimuth Vs and vehicle azimuth Vd, and regards and stores this difference as error E(n) of measured azimuth Vs (S408). Then, control unit 32 obtains average value AV (one example of correction information) of E(1) . . . E(n) (S409, correction information generation process).

Control unit 32 handles average value AV obtained at step S409 as a correction amount (correction information), and subtracts average value AV from measured azimuth Vs obtained at step S307 (shifts measured azimuth Vs by average value AV), thereby obtaining corrected measured azimuth Vsm (S410). Furthermore, control unit 32 recalculates error E(n) with corrected measured azimuth Vsm and causes the result to be stored (S410).

For example, under control of automatic driving, the correction process of FIG. 16 is repeatedly performed, and E(n) is sequentially added until variable n reaches 10 (flow from S411: NO to S408). In a period until variable n reaches 10 (S411: NO), with data string E(n) not satisfying 10 pieces of data, calculation of average value AV at step S409 and calculation of a corrected value at step S410 are performed.

When variable n reaches 10 and a string of 10 pieces of data E(1) . . . E(10) is formed (S411: YES), control unit 32 performs process for retaining the string of 10 pieces of data E(1) . . . E(10) as the latest data (series of processes from S411 to S416). These processes are almost similar to the processes from step S311 to S316 in FIG. 14 referred to in the second embodiment, except for a difference in number of pieces of data in the string between 10 and 100. After the number of pieces of data in the string reaches 10, with 10 pieces of E(n), calculation of average value AV at step S409 and calculation of the corrected value at step S410 are performed.

In the present embodiment, measured azimuth Vs is corrected by using the average value of errors E(n) in measured azimuth Vs. Here, as with the second embodiment, vehicle azimuth Vd, which is an azimuth serving as a reference, is estimated by using magnetic markers. As described in the second embodiment, there are errors in laying positions of the magnetic markers, and deviation from a designed laying line is inevitable. And, the errors in the laying positions of the magnetic markers directly lead to an error in vehicle azimuth Vd estimated on a vehicle side.

By contrast, in a configuration of the present embodiment, for example, a total sum of errors E(n) in measured azimuth Vs is calculated and is then divided by variable n indicating the number of pieces of data to obtain average value AV. According to the calculation of the total sum of errors E(n), the above-described error in vehicle azimuth Vd can be cancelled. Thus, in a configuration of the present embodiment, measured azimuth Vs can be corrected with high accuracy while influence of the error in the laying positions of magnetic markers 10 is suppressed.

Note that while the number of pieces of data is set to 10 as a population to calculate average value AV of errors E(n) when the process of correcting measured azimuth Vs is performed in the present embodiment, this number of pieces of data can be changed as appropriate. In place of 10, the number may be 20 or 30.

The process of correcting measured azimuth Vs of the present embodiment and the process of correcting measured azimuth Vs of the second embodiment may be combined. For example, the correction process of the present embodiment may be applied in a period with a small number of pieces of data immediately after the lane keeping control is started, and the correction process of the second embodiment may be applied in a period with 100 pieces of data or more. In this case, it is possible to combine superiority of the correction process of the present embodiment in which measured azimuth Vs can be corrected with relatively high accuracy even if the number of pieces of data is relatively small and superiority of the correction process of the second embodiment in which measured azimuth Vs can be corrected with high accuracy when the number of pieces of data is sufficiently large.

Note that other configurations and operations and effects are similar to those of the second embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes technologies acquired by variously modifying, changing, or combining as appropriate the above-described specific examples by using known technologies, knowledge of a person skilled in the art, and so forth.

REFERENCE SIGNS LIST 1 driving assist system (vehicle control system)
10 magnetic marker
15 RFID tag (information providing part, wireless tag)
2 measuring unit
21 sensor array (magnetic detecting part)
212 detection processing circuit
22 IMU (azimuth measuring part, generation processing part)
222 acceleration sensor
223 gyro sensor
32 control unit (control part, correcting part, target azimuth setting part)
34 tag reader (information obtaining part)
36 vehicle ECU
5 vehicle

The invention claimed is:

1. A vehicle traveling control method performed by a computer processor for causing a vehicle to travel along a traveling road where markers are arrayed at intervals, the vehicle traveling control method comprising:
an azimuth measuring process performed by the computer processor for measuring a vehicle azimuth indicating an orientation of the vehicle;
a control process performed by the computer processor for controlling the vehicle so that a measured azimuth, which is the vehicle azimuth measured by the azimuth measuring process, is matched with a target azimuth corresponding to a direction of the traveling road; and
a correction process performed by the computer processor for correcting a degree of control by the control process, in order to bring a lateral shift amount of the vehicle with reference to each of the markers closer to zero, in accordance with the lateral shift amount or a magnitude of a physical quantity obtained by performing a process on the lateral shift amount, wherein
the azimuth measuring process is a process of measuring the vehicle azimuth by performing a process on a sensor output outputted from a gyro sensor which measures angular velocity about an axis in a vertical direction,
an information obtaining process performed by the computer processor for reading, from an information providing part annexed to the each of the markers, marker information including at least one of (i) position information indicating a laying position of the each of the markers, and (ii) azimuth information indicating a direction of the traveling road; and
a target azimuth setting process performed by the computer processor for (i) obtaining a direction connecting laying positions of adjacent two of the markers based on the position information indicating the laying position of the each of the markers included in the marker information read in the information obtaining process and setting the direction as the target azimuth, or (ii) setting, as the target azimuth, the direction of the traveling road in accordance with the azimuth information included in the marker information read in the information obtaining process.

2. The vehicle traveling control method in claim 1, wherein the information providing part is a wireless tag annexed to the each of the markers.

3. The vehicle traveling control method in claim 1, comprising:
a correction information generation process performed by the computer processor for performing a process on a difference between the measured azimuth and the vehicle azimuth with reference to the markers estimated by using the markers arranged along the traveling road and obtaining correction information; and
a correction process performed by the computer processor for correcting the sensor output or the measured azimuth by using the correction information.

4. The vehicle traveling control method in claim 3, wherein the correction information is information indicating a temporal change of the difference, and
the correction process of correcting the measured azimuth is a process of correcting the sensor output or the measured azimuth by a correction amount based on the correction information.

5. The vehicle traveling control method in claim 3, wherein the correction information is a temporal average value of the difference, and
the correction process of correcting the measured azimuth is a process of subtracting a correction amount corresponding to the temporal average value of the difference from the measured azimuth.

6. A vehicle control system including a computer processor for causing a vehicle to travel along a traveling road where markers are arrayed at intervals, comprising:
an azimuth measuring part which measures a vehicle azimuth, which is an orientation of the vehicle;
a control part performed by the computer processor for controlling the vehicle so that a measured azimuth, which is the vehicle azimuth measured by the azimuth measuring part, is matched with a target azimuth corresponding to a direction of the traveling road; and
a correcting part which corrects a degree of control by the control part, in order to bring a lateral shift amount of the vehicle with reference to each of the markers closer to zero, in accordance with the lateral shift amount or a magnitude of a physical quantity obtained by performing a process on the lateral shift amount, wherein:
the azimuth measuring part includes a gyro sensor which measures angular velocity about an axis in a vertical direction and a generation processing part which performs a process on a sensor output outputted from the gyro sensor and generates the vehicle azimuth,
an information obtaining part which reads, from an information providing part annexed to the each of the markers, marker information including at least one of (i) position information indicating a laying position of the each of the markers, and (ii) azimuth information indicating a direction of the traveling road; and
a target azimuth setting part performed by the computer processor for (i) obtaining a direction connecting laying positions of adjacent two of the markers based on the position information indicating the laying position of the each of the markers included in the marker information read by the information obtaining part and sets the direction as the target azimuth, or (ii) setting, as the target azimuth, the direction of the traveling road in accordance with the azimuth information included in the marker information read by the information obtaining part.

7. The vehicle traveling control method in claim 3, wherein
 the correction information is information indicating a temporal change of the difference, and
 the correction process of correcting the measured azimuth is a process of correcting the sensor output or the measured azimuth by a correction amount based on the correction information.

8. The vehicle traveling control method in claim 7, wherein
 the correction information includes at least a gradient a of a straight line approximating the temporal change of the difference, and
 the correction process of correcting the measured azimuth is a process of subtracting the correction amount corresponding to the gradient a from the sensor output of the gyro sensor.

9. The vehicle traveling control method in claim 7, wherein
 the correction information includes at least a gradient a and an intercept b of a straight line approximating the temporal change of the difference, and
 the correction process of correcting the measured azimuth is a process of subtracting the correction amount, which is obtained by multiplying a value of the gradient a by an elapsed time T from a starting point of the temporal change of the difference and adding a value of the intercept b, from the measured azimuth.

10. The vehicle traveling control method in claim 1, wherein
 the azimuth measuring process is a process of measuring the vehicle azimuth by setting the vehicle azimuth with reference to the markers based on a shift angle of the vehicle azimuth with respect to a direction of a line segment connecting two of the markers arranged along the traveling road and a designed value of the direction of the line segment as an initial value.

11. The vehicle traveling control method in claim 1, wherein
 the correction process is a process of correcting the degree of control by the control process in accordance with a magnitude of the physical quantity obtained by performing a filter process for attenuating high-frequency components on a change in the lateral shift amount, and
 the measured azimuth which is a control target of the control process is the vehicle azimuth itself measured by the azimuth measuring process.

12. The vehicle traveling control method in claim 1, wherein
 the target azimuth in the control process is an azimuth calculated, based on the direction of the traveling road, by an arithmetic equation in which a specification value of the vehicle is set as a variable, and
 the specification value of the vehicle is a dimension of a wheel base of the vehicle.

13. The vehicle traveling control method in claim 7, wherein
 the azimuth measuring process is a process of measuring the vehicle azimuth by setting the vehicle azimuth with reference to the markers based on a shift angle of the vehicle azimuth with respect to a direction of a line segment connecting two of the markers arranged along the traveling road and a designed value of the direction of the line segment as an initial value.

14. The vehicle traveling control method in claim 7, wherein
 the correction process is a process of correcting the degree of control by the control process in accordance with a magnitude of the physical quantity obtained by performing a filter process for attenuating high-frequency components on a change in the lateral shift amount, and
 the measured azimuth which is a control target of the control process is the vehicle azimuth itself measured by the azimuth measuring process.

15. The vehicle traveling control method in claim 7, wherein
 the target azimuth in the control process is an azimuth calculated, based on the direction of the traveling road, by an arithmetic equation in which a specification value of the vehicle is set as a variable.

16. The vehicle traveling control method in claim 1, wherein
 the method further comprises a marker detection process performed by the computer processor for the detecting of each of the markers and obtaining the lateral shift amount,
 the marker detection process is repeatedly performed and a plurality of the lateral shift amounts are obtained, and
 the physical quantity is a quantity obtained by the computer processor performing a filter process for attenuating high-frequency components on a temporal change in the plurality of the lateral shift amounts.

17. The vehicle traveling control method in claim 16, wherein the filter process is a process of calculating an average value of the plurality of the lateral shift amounts.

18. The vehicle control system in claim 6, wherein
 the system further comprises a marker detection part which detects the each of the markers and obtains the lateral shift amount,
 the marker detection part repeatedly performs the detection of the each of the markers and to obtain the plurality of the lateral shift amounts, and
 the physical quantity is a quantity obtained by performing a filter process for attenuating high-frequency components on a temporal change in the plurality of the lateral shift amounts.

19. The vehicle traveling control method in claim 18, wherein the filter process is a process of calculating an average value of the plurality of the lateral shift amounts.

20. The vehicle traveling control method in claim 10, wherein
 in the azimuth measuring process, the shift angle of the vehicle azimuth with respect to the direction of the line segment connecting the two of the markers is detected by detecting adjacent two markers simultaneously using two sensor arrays arranged in the longitudinal direction of the vehicle arranged with a pitch being a same as a pitch of the adjacent two markers.

* * * * *